Aug. 18, 1931.  E. J. ENS  1,819,084
QUADRUPLEX ACCUMULATOR CALCULATING MACHINE
Filed Dec. 1, 1928  9 Sheets-Sheet 2
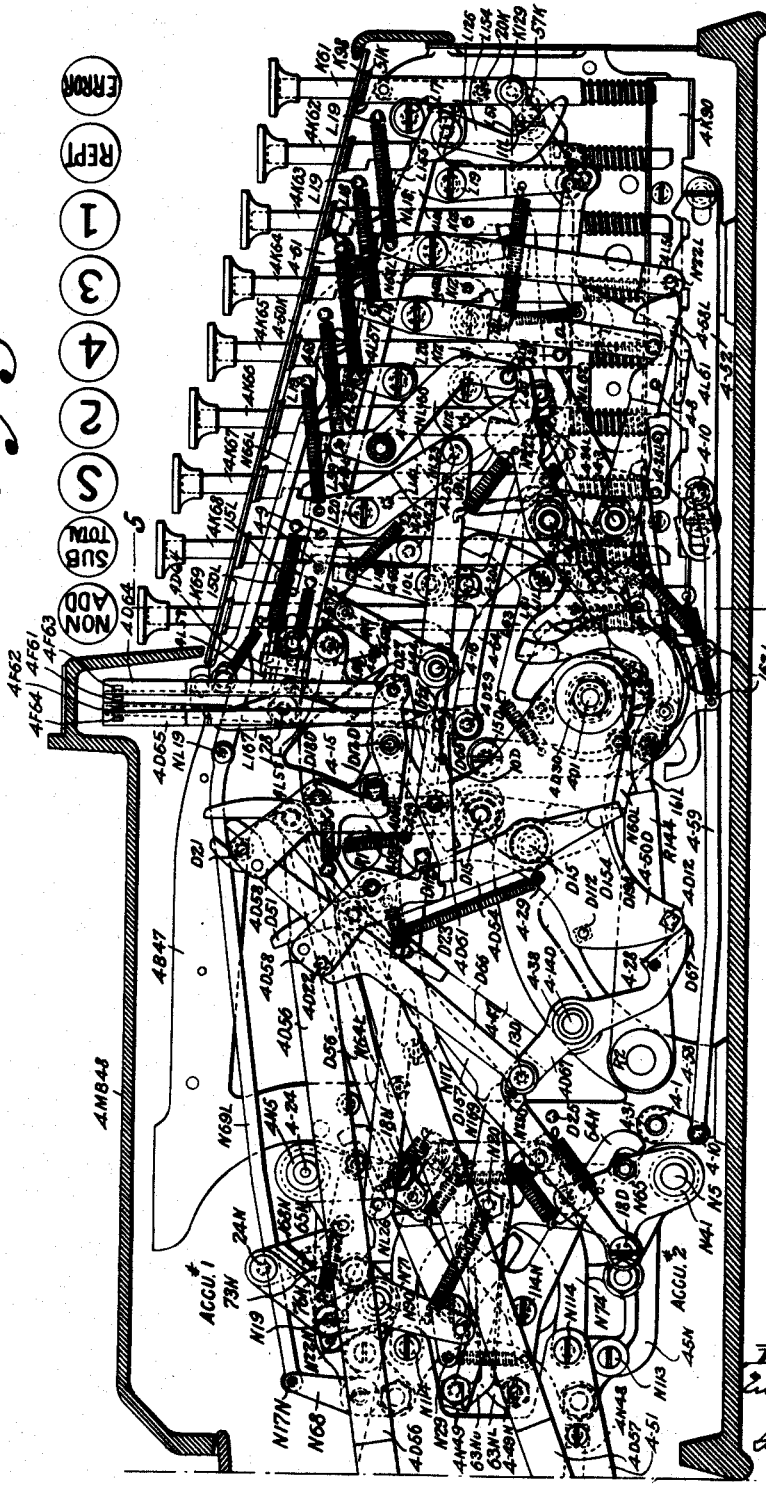

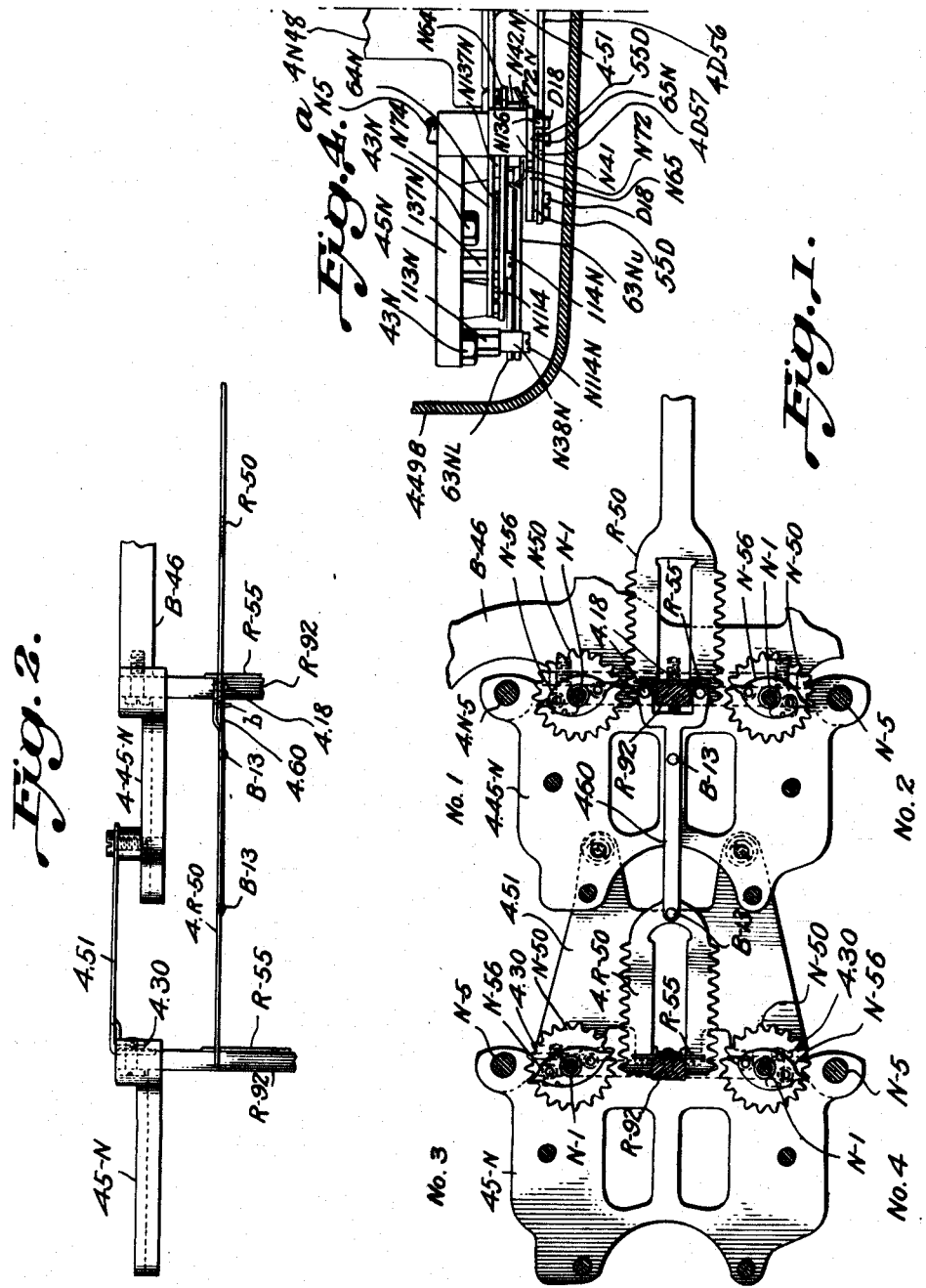

Aug. 18, 1931.  E. J. ENS  1,819,084
QUADRUPLEX ACCUMULATOR CALCULATING MACHINE
Filed Dec. 1, 1928  9 Sheets-Sheet 3
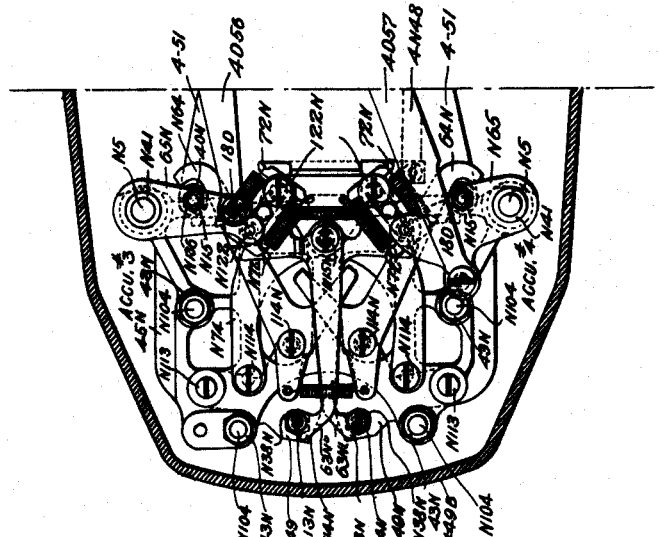
Fig. 3ª
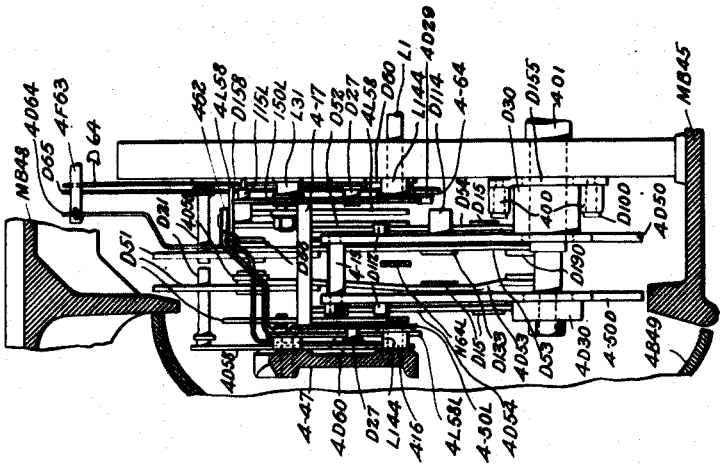
Fig. 5.
Inventor,
Emil John Ens
By _____ Atty.

Aug. 18, 1931.　　　　　　E. J. ENS　　　　　1,819,084
QUADRUPLEX ACCUMULATOR CALCULATING MACHINE
Filed Dec. 1, 1928　　9 Sheets-Sheet 4

Fig. 4.

Inventor,
Emil John Ens
By
Atty.

Aug. 18, 1931.  E. J. ENS  1,819,084
QUADRUPLEX ACCUMULATOR CALCULATING MACHINE
Filed Dec. 1, 1928  9 Sheets-Sheet 5
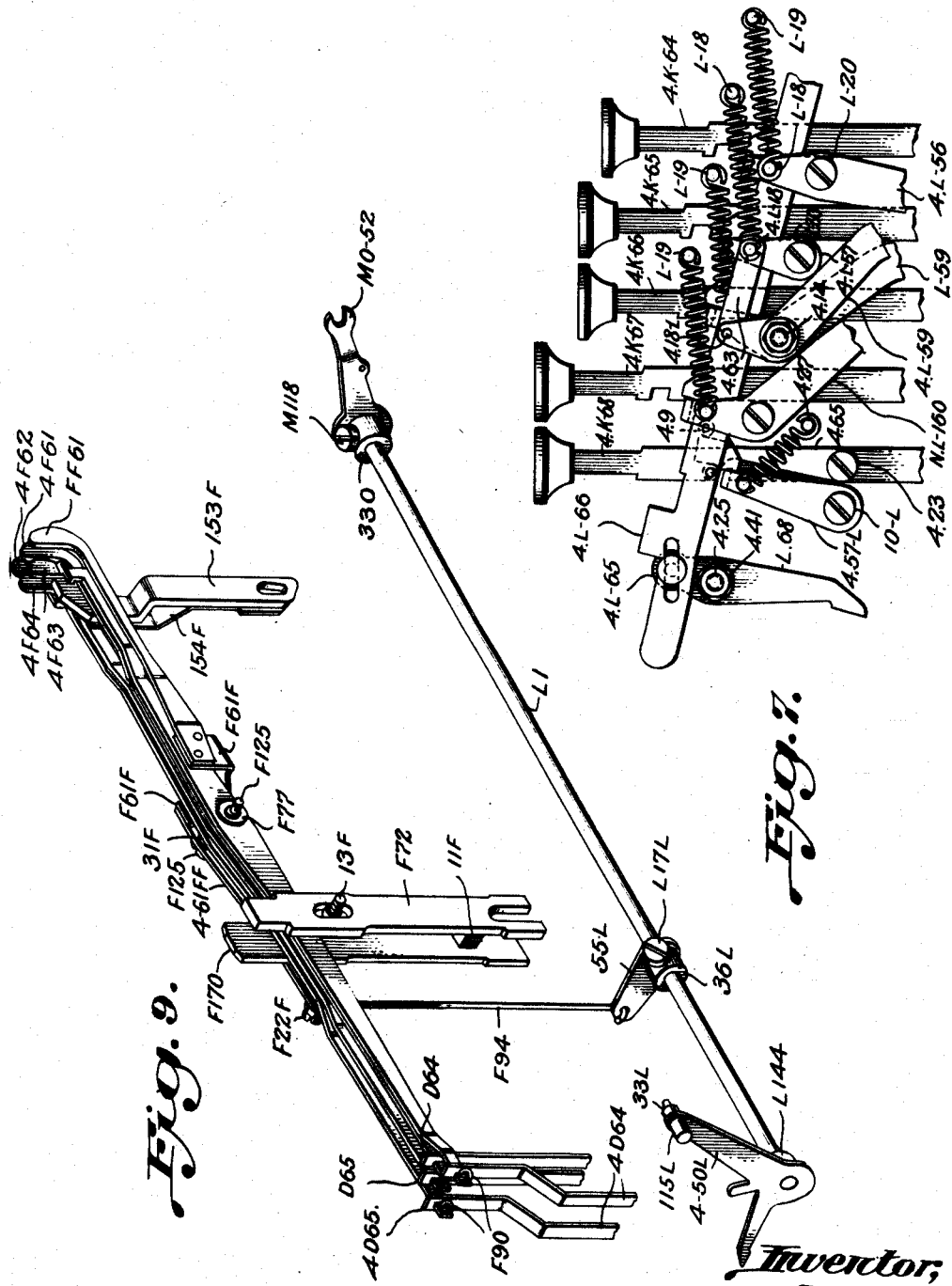

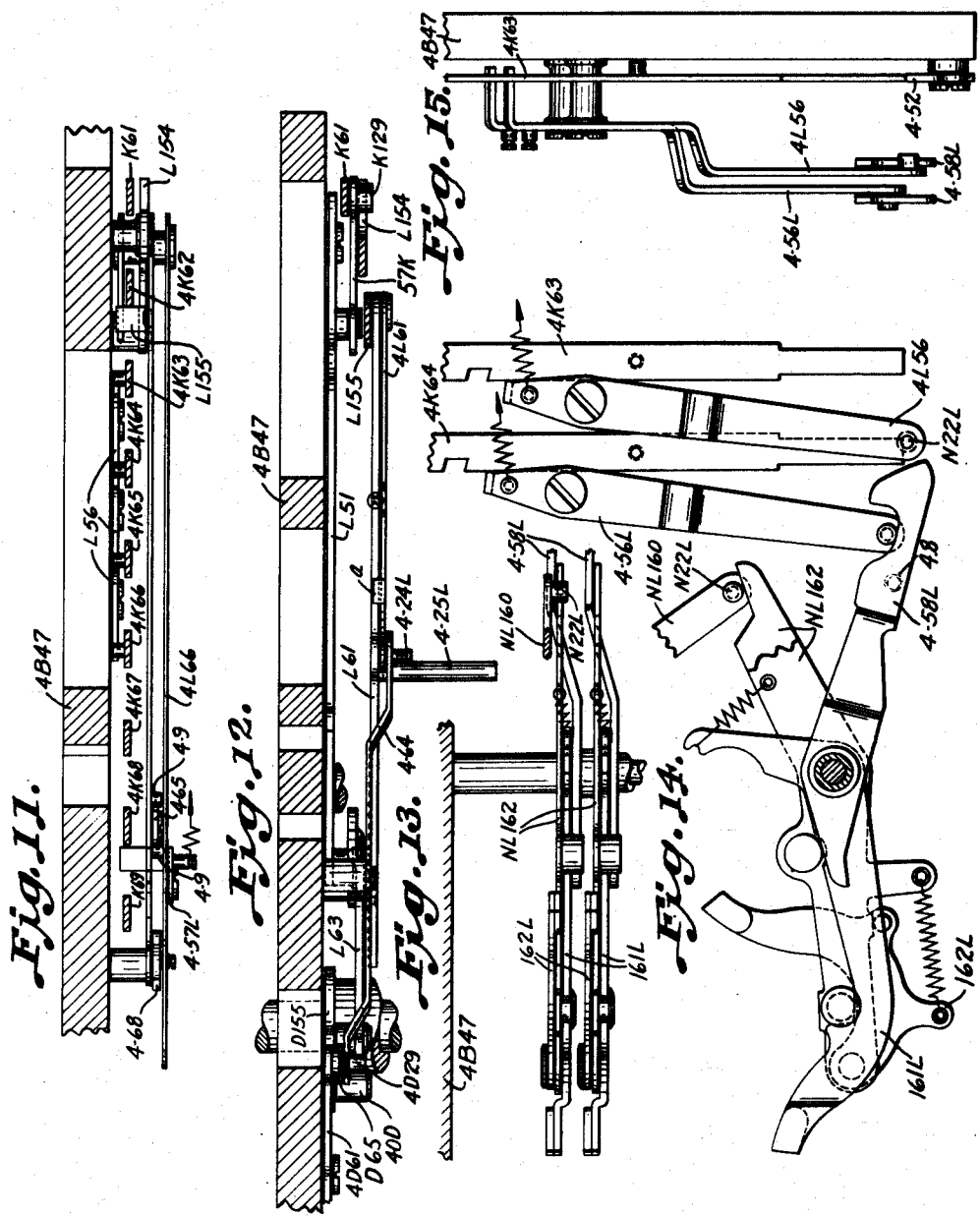

Aug. 18, 1931.  E. J. ENS  1,819,084
QUADRUPLEX ACCUMULATOR CALCULATING MACHINE
Filed Dec. 1, 1928  9 Sheets-Sheet 8
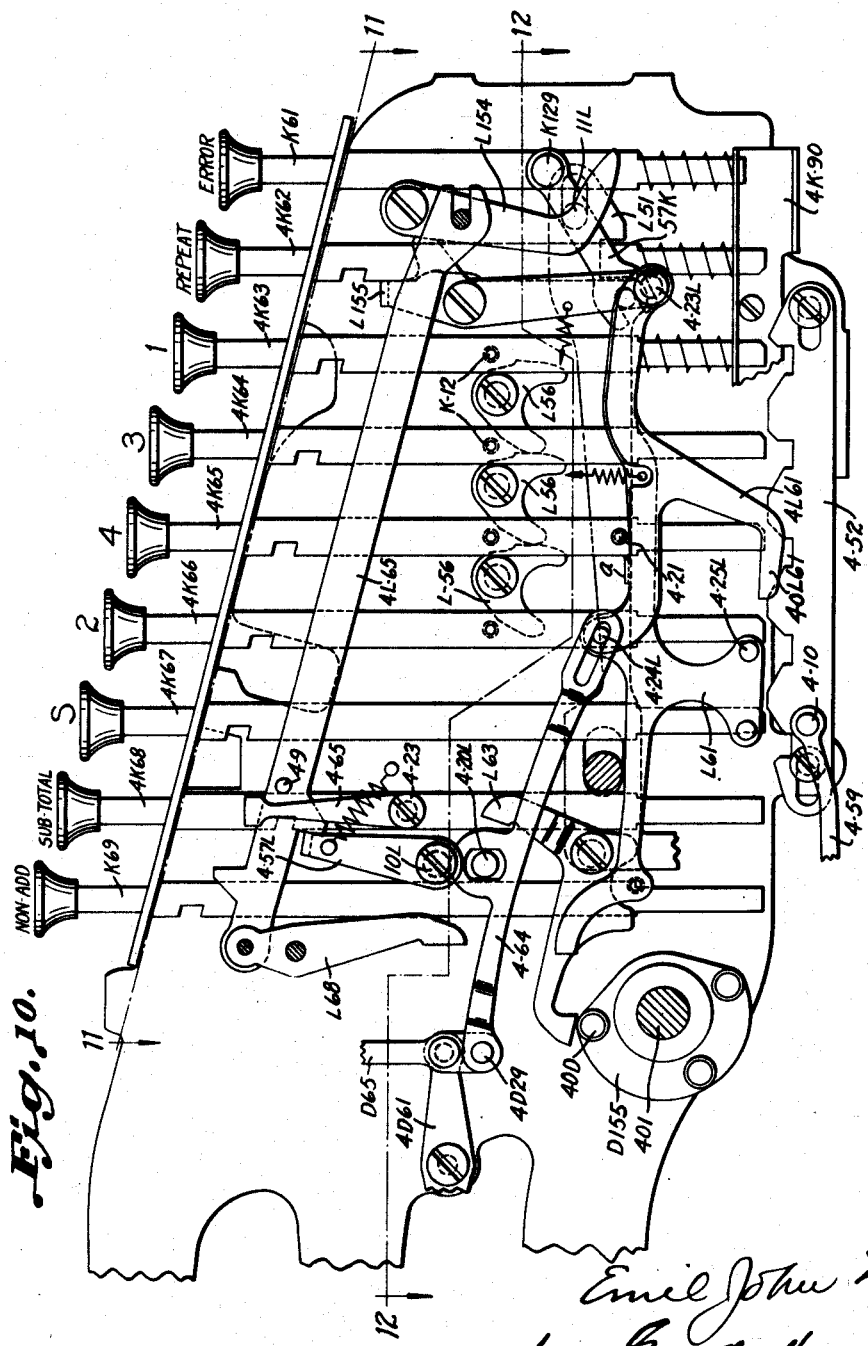

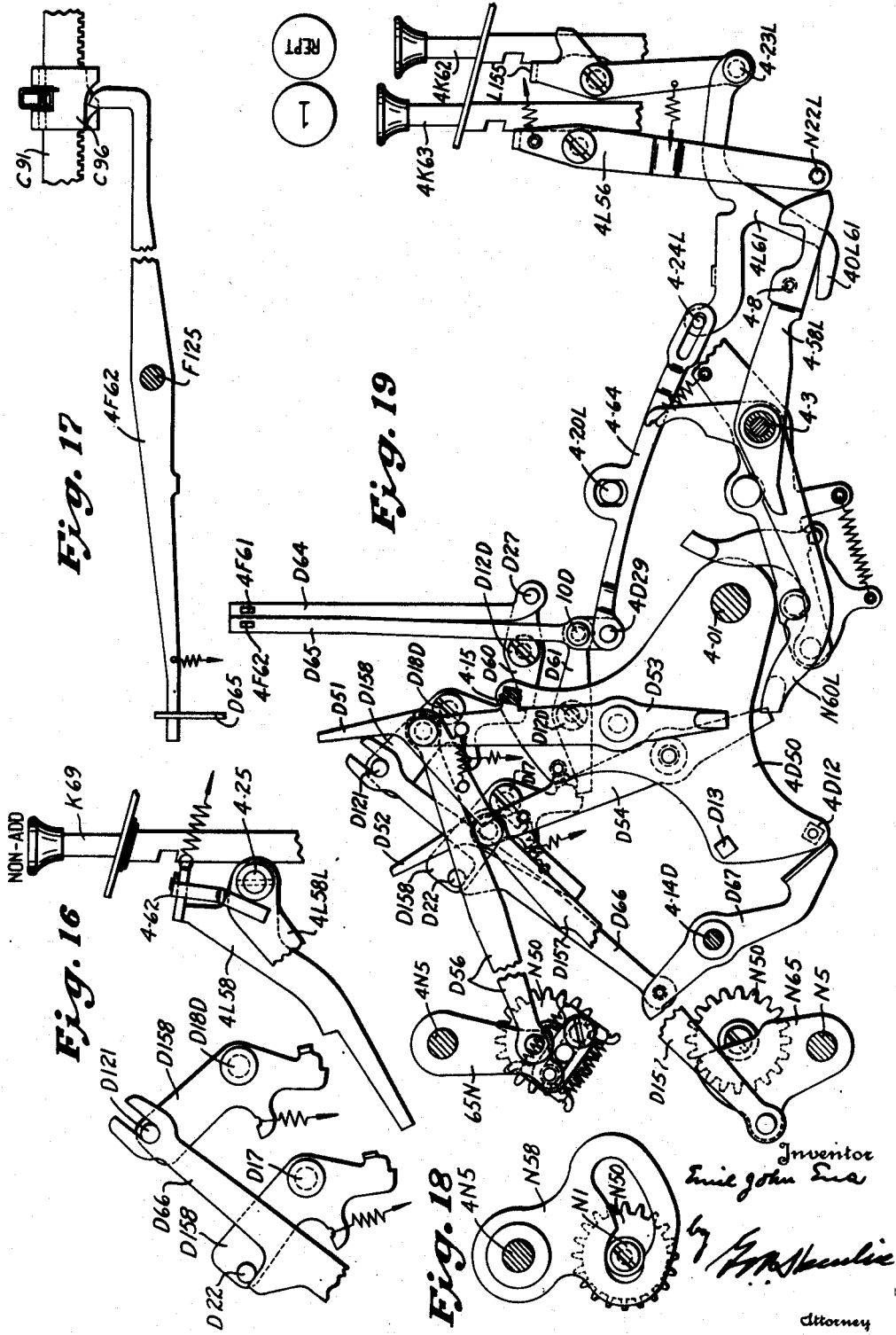

Patented Aug. 18, 1931

1,819,084

UNITED STATES PATENT OFFICE

EMIL JOHN ENS, OF NEWARK, NEW JERSEY, ASSIGNOR TO ELLIS ADDING TYPEWRITER COMPANY, OF NEWARK, NEW JERSEY, A CORPORATION OF NEW JERSEY

QUADRUPLEX ACCUMULATOR CALCULATING MACHINE

Application filed December 1, 1928. Serial No. 323,124.

Heretofore the "Ellis" adding machine, or adding and subtracting machine, has employed only two accumulators, together with mechanism whereby either or both of the accumulators may be utilized or cut-out by the use of adding or subtracting keys, a non-add key, or, the travelling carriage when the latter is in predetermined tabulated positions.

Ellis Patents No. 1,197,276 and No. 1,197,278, dated September 5, 1916; No. 1,203,863, November 7, 1916; and the patent to Bernau, No. 1,550,945, dated August 25, 1925, are among the patents setting forth the foregoing mechanisms.

The "Ellis" machine has also been provided with a signal or symbol printer which is manually positioned by the operation of the respective controlling keys, of which an instance is the patent to Bernau No. 1,599,634, dated September 14, 1926.

There are, however, many calculations, particularly in connection with department store and bank accounting, which cannot be adequately taken care of on a machine having but two accumulators, even though one or both of those accumulators be adapted for either addition or subtraction as proposed, for instance, in the Ellis Patent No. 1,203,863.

To meet the need mentioned, I have provided, in addition to the usual upper combined adding and subtracting accumulator and lower adding accumulator which have heretofore characterized the Ellis machine, two additional adding accumulators combined with improved controlling and selecting mechanism, whereby addition may be performed in any one of the adding accumulators, addition or subtraction performed in the combined adding and subtracting accumulator, addition simultaneously performed in selected ones of the adding accumulators, amounts transferred from one accumulator to another, all additive operations being solely controlled by the tabulated position of the carriage, as all adding keys are dispensed with, subtracting and non-add functions obtained by using subtraction and non-add keys, a total taken from any accumulator by the use of a total key therefor, and a sub-total taken from any selected accumulator by the conjoint use of a single sub-total key and the total-key of the selected accumulator.

The present invention also contemplates the provision of improvements in the signal or symbol printer, whereby the depression of any total key or the subtracting key positively sets the signal printer, together with retaining or alining means, representing improvements over the mechanism of the Bernau Patent No. 1,599,634.

By utilizing settable stops on the travelling carriage and mechanism operated thereby for solely controlling and additive functions of the accumulators, the present machine dispenses with all adding keys and by providing only a single sub-total key with improved mechanism whereby said key may be utilized to obtain a sub-total from any selected accumulator provided the total key for that accumulator be depressed, a separate sub-total key for each accumulator is eliminated; consequently, the row of controlling or operating keys is restricted to a non-add key, a single sub-total key, a single subtraction key, an error key, repeat key, and four total keys for the respective accumulators, rendering it easy for the operator to non-add, subtract, and take totals and sub-totals when desired, beside minimizing errors, otherwise necessitated by constant attention to the keys which are eliminated by the present machine; it being understood, as above explained, that addition in the accumulators is solely controlled by carriage position through the medium of settable stops on the carriage and mechanism in the machine operated by said stops according to the tabulated position of the carriage.

The present invention also provides improvements in respect to combined use of the repeat key and the total key for the combined adding and subtracting accumulator, whereby, despite the fact that the additive function is solely controlled by tabulated carriage position, nevertheless, if the repeat key and the total key for the combined adding and subtracting accumulator both be depressed at the same time, the total taken in the combined adding and subtracting accumulator will be added into, or transferred to another accumulator, for instance, the main adding accumulator of the Ellis machine.

Furthermore, provision is made for subtracting from the adding and subtracting accumulator, the total carried by one of the adding accumulators, for instance the main accumulator if, and when, the total key for that accumulator and the subtracting key are simultaneously depressed. The interlock bar which is manually shifted by the total keys and the subtracting key for the purpose of setting the signal printer, is so made that the aforesaid keys may be simultaneously depressed although the remaining total keys are locked out.

Other novel features and improved combinations appear more fully from the following description and the disclosures of the drawings.

I am aware that the present machine may be built with only one additional accumulator, so that it will constitute a three-accumulator machine instead of the four-accumulator machine hereinafter described and shown in the drawings, in which:

Figure 1 is a detail longitudinal section through the main and auxiliary accumulators, the racks or actuators and accumulator wheels being in normal and disengaged position;

Fig. 2 is a plan view of the right hand or units rack or actuator and parts of the frames therefor;

Fig. 3 is an elevation of the left side of the machine, broken away at the rear;

Figure 8:
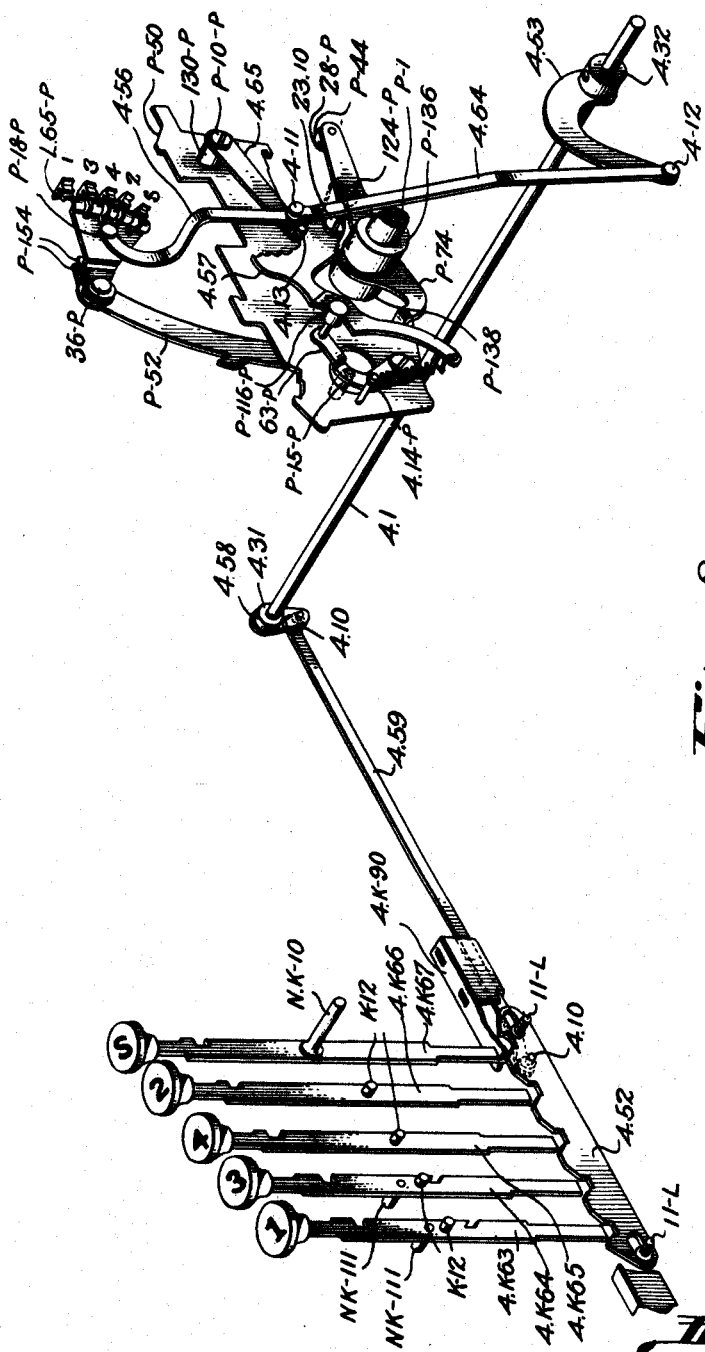

Fig. 3ª is a view similar to Fig. 3, showing the auxiliary accumulators, the broken vertical lines on Figs. 3 and 3ª indicating the junctions of the parts;

Fig. 4 is a plan view of the left side of the machine, broken away at the rear;

Fig. 4ª is a view like Fig. 4, showing the parts at the rear of the machine which adjoint those disclosed in Fig. 4, as indicated by the broken lines in Figs. 4 and 4ª;

Fig. 5 is a vertical section taken on the line 5—5, Fig. 3, the operative parts being in full lines;

Fig. 6 is a plan view of the operating or controlling keys at the left side of the keyboard;

Fig. 7 is a detail side elevation of certain ones of the operating or controlling keys and associated latches and mechanisms, the sub-total and No. 2 total keys being in depressed position and the remaining keys in raised position;

Fig. 8 is a detail perspective view showing the signal or symbol printer and the means whereby it is operated by the total and sub-total keys and the subtraction key;

Fig. 9 is a detail perspective view of the carriage-operated levers and associated means;

Fig. 10 is an elevation of the bank of operating or controlling keys, certain parts being omitted, disclosing key interlocks, repeat key mechanism, sub-total repeat key and latch, and a part of the No. 2 accumulator controlling means;

Fig. 11 is a section taken on the line 11—11 of Fig. 10;

Fig. 12 is a section taken on the line 12—12 of Fig. 10;

Fig. 13 is a plan view of a portion of Fig. 14, showing the total control and cams and illustrating their spaced relationship to the side frame;

Fig. 14 is a detail side elevation of the total control and cams, and the No. 1 and No. 3 total keys and their latches;

Fig. 15 is a front detail elevation of a part of Fig. 14, showing one of the total keys, latches, and the cam bar for the signal;

Fig. 16 is a detail view of the connection between the non-add key and the accumulator controlling pin arms for the No. 1 and No. 2 accumulators, illustrating how the depression of this key blocks these arms and prevents these accumulators from engaging the adding racks;

Fig. 17 is a detail view showing how the hanging bar lever for the No. 2 accumulator is operated by the stop on the carriage rack;

Fig. 18 is a detail view of the cam for engaging the No. 1 accumulator with the adding racks; and Fig. 19 is a detail view looking in the opposite direction to that from which Fig. 18 is viewed, showing the manner in which the carriage causes the engagement of the No. 1 and No. 2 accumulators with the adding racks for additive operations and, also how, upon depression of the No. 1 accumulator key and the repeat key, a transfer of the total from accumulator No. 1 into accumulator No. 2 may be effected.

Only so much of the Ellis machine is shown as will afford a clear understanding of the mechanism having to do with the present invention. Reference is to be had to patents heretofore mentioned for a full disclosure of the remaining parts of the Ellis machine to afford a complete understanding of those mechanisms which are not directly involved in the present invention.

It will be understood, however, that whereas the travelling carriage of the Ellis machine is not illustrated, said carriage has a rack carrying adjustable stops for cooperation with the levers shown in Fig. 9, it being understood that in addition to the levers and hanging bars provided in the Ellis machine for the control of the accumulators by the tabulated position of the carriage, additional levers and hanging bars are provided in the present machine and suitable stops to co-operate with the levers are adjustably carried by the rack bar on the carriage. Reference is to be had to Ellis Patents Nos. 1,197,276 and 1,197,278, September 5, 1916 for a full disclosure of the manner in which the carriage and its stops control the accumulators.

The lower part of the case of the machine appears at MB45 and the upper part is shown at 4MB48.

The deck or top plate of the keyboard section appears at 4.50K.

The main and internal frame is shown at 4B47.

The two accumulators which are characteristic of the Ellis machine are carried by plates 4.45N secured to the frame 4B47. These accumulators which, for convenience of reference, are designated as upper accumulator No. 1 and lower accumulator No. 2, are of the same general construction and operation as those which are shown and described in Ellis Patent No. 1,203,863, November 7, 1916, with any desired improvements as, for instance, disclosed in the patent to Bernau No. 1,508,267, September 9, 1924. Following the usual practice in connection with the Ellis machine, the upper accumulator No. 1 is a combined adding and subtracting accumulator while the lower accumulator No. 2, is an adding accumulator.

Certain mechanisms at the left side of the machine which are under the control of the carriage and of the controlling keys, are supported by the frame 4B47 and the auxiliary frame 4.47, as will presently appear.

A removable side plate 4B49 covers the operating mechanisms and the main accumulators and enables access to be readily had to the left side of the machine.

Two additional adding accumulators are provided, these being an auxiliary upper accumulator No. 3 and a lower accumulator No. 4. The mechanisms of the auxiliary or supplemental accumulators are carried by frames 45N attached to frames 4.45N by the carrying plates 4.51, said plates 4.51 being connected and braced by cross bar 4N48.

The adding racks or actuators for the main accumulators No. 1 and No. 2, appear at R. 50 (Figs. 1 and 2); the wheels or gears are shown at N50; the carrying cams appear at N56 and the shafts of the accumulators are shown at N1, all in accordance with the disclosures of the Ellis patents. Whereas in Fig. 1, only one wheel and cam of each accumulator is shown and only one rack is disclosed, it will be understood that the accumulator wheels and racks, carrying cams and the remaining parts of the carrying mechanisms of said accumulators are in accordance with the disclosures of the Ellis patents.

The upper and lower accumulators comprising the auxiliary accumulators No. 3 and No. 4 also are complete although only partial illustration is given. Extension or auxiliary racks 4R50 have forked shaped front ends which carry pins 4.18 fitting in holes in the rear ends of the racks R50 and retained therein by flat springs 4.60 which are riveted at B13 to the auxiliary racks. A projection b from the auxiliary rack when pushed down flush with the spring, carries the ends of the pins 4.18 far enough to disengage them from the holes in the main racks R50.

The respective racks R50, 4R50 are guided by the bars R92 and the plates R55.

It will be observed that the auxiliary accumulators have their frame detachably connected to the frame of the main accumulators and that they are housed within detachable extension housings 4.49B at the rear of the machine. On removing the housing 4.49B, the auxiliary accumulators are rendered accessible for inspection or repair and, further, they may be entirely detached if necessary or if inspection or adjustment of the main accumulators No. 1, No. 2, becomes necessary.

It will be observed, from a reading of the following description, that in a number of instances, operating parts heretofore known in the Ellis machine are made duplex in spaced arrangement, and provided with cross connections or pins for simultaneous operation so that provision is made for the additional actuating mechanisms necessitated by the provision of the auixilary accumulators Nos. 3 and 4 but that, on the other hand, new "pieces" and combinations of pieces or parts such as latches, levers, links, interlocks and interacting elements are provided to effectuate the purposes of the invention hereinbefore set forth and which cannot possibly be accomplished by mere duplication because they involve new mechanical movements and coordination of parts. The main or front accumulators Nos. 1 and 2 are connected by the connecting rods D56 and D157 to the respective flying levers D53 and D54 mounted on the operating arm 4D50 which is secured to the main operating shaft 4.01 which is driven by the usual handle or motor.

On the other hand, the auxiliary accumulators No. 3 and No. 4 are connected to their respective flying levers 4D53 and 4D54 by rods 4D56 and 4D57, these flying levers 4D53 and 4D54 being mounted on an operating arm 4.50D which is held on the main operating shaft 4.01. A square bar 4.15 secured to the operating arms 4.50D and 4D50 cross-connects these arms so that they are adapted to move in unison.

Horizontal posts 4.14D; 4.2 and 4.3 support the auxiliary frame 4.47 from the main frame 4B47.

Pivoted to the frame 4.47 are the adding latches 4D60 and 4D61. The frame 4.47 also supports the controlling pin arms 4D58 and pins 4.29 for the springs for accumulators Nos. 3 and 4, and a pin 4.16 which pivotally carries the outer starting bar lock-lever 4.50L (Figs. 3 and 9), and also the pivot screw 4.25 for the non-add lever for the No. 3 and No. 4 accumulators.

Pivoted on the post 4.14D are the restoring levers D67 and 4D67. A pin 4.28 secured to the lever 4D67 extends under a lip on the lever D67 and arrests the lever 4D67 when the lever D67 is arrested by engagement with the pin D25.

The controlling pin arms 4D58 carry controlling pins D21 and D22, respectively for controlling the accumulators Nos. 3 and 4. The remaining two controlling pin arms D158 carry the controlling pins D121 and D22 for the No. 1 and No. 2 accumulators.

The restoring bars D66 respectively restore the pairs of controlling arms and are themselves operated by the levers D67 and 4D67.

The total cam 59L and total cam lever 161L are pivoted on the post 4.2, there being two sets of these pieces, spaced apart by the collars 4.34 and 4.35. This cam-lever is used in connection with the lower accumulators Nos. 2 and 4.

The total cam 4.58L, total cam lever N60L and subtracting cam NL162 are pivoted on the post 4.3, two sets being used.

As in the Ellis Patent No. 1,197,276, September 5, 1916, so in the present machine, there are two controlling pin latches D60, D61 pivoted at D12D on the side frame 4B47.

In addition to the aforesaid latches D60, D61, there are two pin latches 4D60, 4D61 pivoted on the auixilary frame 4.47.

The latches D60, D61, 4D60, 4D61 are operated by respective hanging bars D64, D65, 4D64, 4D65 from horizontally arranged levers (Fig. 9) 4F63, 4F61, 4F62, and 4F64 pivoted to the machine frame at F125 and provided with up-standing points at their right hand ends for engagement with the adjustable stops mounted on a rack bar carried by the carriage of the machine, as illustrated in Fig. 56 of Ellis Patent No. 1,197,276 and which general plan of carriage control is disclosed in Fig. 5 of Ellis Patent No. 1,197,278.

Considering Figs. 17, 18 and 19, as the stop C96 strikes the finger of the hanging bar lever 4F62 it raises the hanging bar D65, and rocks the latch D61 counter-clockwise, thus releasing the controlling pin arm D158 associated with the No. 2 accumulator.

Upon operation of the machine after this release has been effected, the operating arm 4D50 is rocked clockwise, and as this takes place the restoring lever D67 is rocked counter-clockwise and the restoring bar D66 moved downwardly in the direction of its length, thus removing its shoulder from beneath the pin D22, whereupon the spring connected to the controlling pin arm D158 rocks said arm counter-clockwise.

As the operating arm 4D50 rocks said arm counter-clockwise, the flying lever D54 which is pivoted thereto at D15 rocks counter-clockwise due to the fact that it is pivoted at its upper end to the accumulator engaging link D157. This movement of the flying lever D54 places the lower end of the flying lever pawl D52 in the path of the square stud 4D12 on the operating arm 4D50, consequently the stud 4D12 by its contact with the pawl D52 stops the counter-clockwise rotation of the flying lever D54; and continued movement of the operating arm 4D50, carrying the flying lever D54 therewith, draws the engaging link D157 toward the right and rocks the arm N65 and shaft N5 clockwise. The shaft N5 has secured thereto an engaging arm (not shown) but similar to the engaging cam N58 of Fig. 18, which engages the shaft carrying the accumulator gears N50 of the No. 2 accumulator, and moves those gears upwardly (see Fig. 1) into engagement with the racks R50, these racks having been set differentially according to the values set up on the keyboard prior to the engagement of the gears N50 therewith.

After such engagement the racks are restored to their normal positions, thus adding on the accumulator the amount set up on said racks, and the operating arm 4D50 (Fig. 19) is moved counter-clockwise, during which movement it restores the flying lever D54 to normal position and the latter, through the link or rod D157, rocks the shaft N5 to disengage the No. 2 accumulator from the racks R50.

As said arm nears its home position it strikes the flange on the restoring lever D57, rocking the same clockwise and moving the bar D66 to its normal position which, through its contact with the controlling pin D22, rocks the controlling pin arm D158 clockwise until it is in position to be retained in its normal position by the latch D61. As soon as the carriage stop C96 passes off the finger of the lever 4F62 (Fig. 17), the spring connected to the lever rocks the lever counter-clockwise and lowers the hanging bar D65 which rocks the latch D61 clockwise into position to lock the arm D158 in its normal position.

To engage the No. 1 accumulator, the stop C96 must engage the finger of the hanging bar lever 4F61 (Fig. 9) and rock that lever clockwise. Such movement raises the hanging bar D64 (Fig. 19), and rocks the latch D60 counter-clockwise to free the controlling pin arm D158 associated with the No. 1 accumulator. Now, as the arm 4D50 is rocked clockwise the restoring lever D57 is moved counter-clockwise, as before-described in connection with the No. 2 accumulator, and the flying lever D53 rocks counter-clockwise around its pivot D15.

Due to the fact that the arm D158 has been rocked counter-clockwise by its spring, thus removing the controlling pin D121 out of the path of the upper end of the flying pawl D51, this pawl does not change its position relatively to the flying lever D53 as was the case in connection with the pawl D52, and flying lever D54, and consequently the lower end of the pawl D51 is gradually moved into the path of the square stud D13 on the operating arm 4D50.

When the stud D13 contacts the lower end of the pawl D51 it arrests the counter-clockwise motion of the flying lever D53, and as the arm 4D50 continues its clockwise movement, the upper end of the flying lever, moving with the arm 4D50, draws the connecting rod D56 toward the right, thus rocking the arm 65N and shaft 4N5 counter-clockwise. Secured to this shaft 4N5 is an engaging cam N58 having a slot into which projects the accumulator shaft N1. The movement of shaft 4N5 and cam N58 is clockwise, as viewed in Fig. 18, which movement of the cam N58 lowers the accumulator gears N50 into engagement with the racks R50 (Fig. 1).

After this engagement of the accumulator takes place, the pin D13 passes off the end of the pawl D51, and the totalizer gears N50 are held in engagement until the racks are restored to their normal positions, thereby adding into the accumulator the amount set up on the keyboard. The operating arm 4D50 is then restored counter-clockwise to its normal position until the stud 4—15 on the arm 4D50 contacts the flying lever D53, which contact, as the arm 4D50 continues in its counter-clockwise movement to normal position, moves the link D56 to the left to rock the arm 65N and cam N58 clockwise to disengage the accumulator gears N50 from the racks R50. The return of the arm 4D50 also returns the restoring lever D67 and link D66 which rocks the arm D158, for the No. 1 accumulator, clockwise into position to be retained by the latch D60 when the latter is moved clockwise as the carriage stop moves off the finger of the hanging bar lever 4F61 (Fig. 9) to lower the bar D64.

When neither of the two hanging bars D65 or D64 is raised, the controlling pin arms D158 are not rocked counter-clockwise and, consequently, their controlling pins D22 and D121 remain in the positions shown. When the arm 4D50 is rocked clockwise, causing a counter-clockwise movement of the flying levers D53 and D54, the upper ends of the pawls D51 and D52 will eventually contact the controlling pins D121 and D22, respectively. The continued movement of the flying levers D53 and D54 effects a movement of the pawls D51 and D52 so that their lower ends are not moved into the paths of the pins D13 and 4D12 respectively and, consequently, neither of the two totalizers during such an operation will be engaged with the racks.

The No. 3 and No. 4 accumulators are engaged with the rack extensions 4R50 (Fig. 1) in substantially the same manner as the No. 1 and No. 2 accumulators are engaged with the racks R50. Associated with the No. 3 and No. 4 accumulators are hanging bar levers 4F63 and 4F64 respectively (Fig. 9) which have connected thereto hanging bars 4D64 and 4D65. These hanging bars are connected to latches 4D60 and 4D61 respectively (Fig. 3) which control the release of controlling pin arms 4D58 carrying the controlling pins D21 and 4D22 for the No. 3 and No. 4 accumulators respectively. Fig. 6 also shows the operating arm 4—50D carrying the flying lever 4D53 and 4D54 connected to the accumulator engaging rod 4D56 and 4D57 respectively for the No. 3 and No. 4 accumulators. Fig. 3 also clearly shows the restoring lever 4D67 and link D66 which is associated with the No. 3 and No. 4 accumulators.

When either of the hanging levers 4F63 or 4F64 is operated by a carriage stop, the associated hanging bar lever 4D64 or 4D65 is raised and its connected latch 4D60 or 4D61 releases the controlling pin arm 4D58 associated therewith. When either arm is released it functions in the same manner as before described in connection with the No. 1 and No. 2 accumulators to allow its associated flying lever pawl to remain in unchanged position relatively to the flying lever, whereby the lower end of the operated pawl is moved into the path of the square stud D112 or D412 as the case may be, whereupon the corresponding link 4D56 or 4D57 is moved to the right to engage the No. 3 or No. 4 totalizer with the auxiliary racks 4R50.

The non-add lever 4L58L which is pivoted on stud 4.25 and separated from the auxiliary frame 4.47 by a collar 4.41, is cross-connected by an arm 4.62 (Fig. 4) and a pin on said non-add latch, to the companion non-add latch 4L58, whereby these two latches 4L58L, 4L58 move in unison. As a result of this action, when the non-add key stem K69 is depressed, the latches 4L58L, 4L58 will swing into a position which will block the movement of all of the controlling pin arms D158 and 4D58, thus preventing addition in any accumulator even though the position of the carriage and stops carried thereby is such that one or more of the controlling pin latches D60, D61, 4D60, 4D61 are open for addition.

Fig. 16 shows the controlling pin arms D158 associated with the No. 1 and No. 2 accumulators. The non-add key has associated therewith a lever 4L58 normally held in the position shown. When this key is depressed this lever 4L58 is rocked clockwise by the spring hooked to the upper end thereof, whereupon the lower end of the lever is moved into the path of the arm D158 associated with the No. 2 accumulator, and the shoulder on this lever 4L58 is placed in the path of the arm D158 associated with the No. 1 accumulator. Connected to the lever 4L58 by a yoke or bar is the lever 4L58L, only part of which is shown, the lower end of it being identical with the lower end of the lever 4L58. Lever 4L58L is adapted to cooperate with the controlling pin arms 4D58 shown in Fig. 3, and associated with the No. 3 and No. 4 accumulators.

It can therefore be seen that upon depression of the non-add key K69, both levers 4L58 and 4L58L are rocked clockwise by the springs connected to the upper end thereof, so that their lower ends and shoulders are placed in the paths of the lower ends of the controlling pin arms D158 and 4D58, consequently locking these arms in their normal positions.

With these arms so locked, any movement of the hanging bar levers 4F61 to 4F64 by the carriage stop, while it raises the hanging bars D64—D64 and 4D64 and 4D65 and releases all latches associated with these arms, said arms will not be moved upon operation of the machine, and consequently the controlling pins D121, D22, D21 and 4D22 will remain in their normal positions, thus causing a rocking movement of all of the flying lever pawls so as to move the lower ends thereof out of the paths of the square studs on the operating arms 4D50 4—50D. Consequently, none of the accumulators can be engaged with the racks when the flying lever pawls are not contacted and moved by the studs D13, 4D12 on arm 4D50, and the studs D112 and 4D12 on the arm 4—50D.

There is a non-add operating lever comprising the piece FF61 having an upstanding point arranged to be engaged by the non-add stop on the carriage, a bridge piece F61F and a piece 4.61FF, the latter being pivoted on the stud F125 and connected by link 94 to an arm 55L secured at L17L to shaft L1 which runs across the machine from the left to the right side thereof and is provided with an arm MO52 secured at M118 which is adapted to lock and unlock the starting bar of the machine. The means for locking and unlocking the starting bar may be varied from that shown at MO52. The operation of the shaft L1 will be better understood from reference to Fig. 48 of the Ellis Patent No. 1,197,276.

The carriage stops and the stops which are adapted to contact with the plunger F72 will be provided as set forth in Ellis Patent No. 1,197,276.

The stops carried by the carriage which are intended for contact with the plungers 153F and 154F for the purpose of stopping the carriage and depressing the upstanding points of one or more of the levers shown in Fig. 9, will be understood as to construction, modification, and use from Fig. 56 of Ellis Patent No. 1,197,276 and Fig. 5 of Ellis Patent No. 1,197,278. The resulting action is the selective control of the accumulators, according to tabulated position of the carriage and the position of the stops on said carriage.

The left end of the shaft L1 carries the starting lock lever 50L. This lever 50L is connected by a bar 4.17 to a corresponding lever 4.50L which is pivoted on the frame 4.47 at 4.16. These levers 50L and 4.50L move in unison and co-operate with the pins D27, 10D carried by the adding latches D60, D61 and are under the influence of the latches 4D60, 4D61, operation in that respect being on the principle set up in the Ellis Patents Nos. 1,197,276 and 1,197,278.

In the present machine, as previously described, the adding keys for the respective accumulators which have heretofore been used in the Ellis machine to enable addition to be performed in a given accumulator, are entirely dispensed with, and the control of addition in the respective accumulators is by the tabulated position of the carriage, subject to certain qualifications under certain conditions hereinafter pointed out.

The controlling or operating keys by which different functions of the machine are controlled, appear in Fig. 6. These keys are the error key K61; the repeat key 4K62; the total key 4K63 for accumulator No. 1; the total key 4K64 for accumulator No. 3; the total key 4K65 for accumulator No. 4; the total key 4K66 for accumulator No. 2; the subtraction key 4K67; the sub-total key 4K68; and the non-add key K69; the latter having been heretofore mentioned.

In the present machine, having brought the travelling carriage to the proper position where the stop thereof which controls a given accumulator is in contact with the upstanding point of a given lever 4F61, 4F62, 4F63, or 4F64, the selected accumulator is conditioned by the depression of the given lever aforesaid, for the performance of addition in said accumulator. Addition may be performed in the selected accumulator so long as the carriage remains in the position where the controlling lever for that accumulator is depressed. If, having added in the selected accumulator, it is desired to take a sub-total, without clearing, in the present machine all that is necessary is to depress the sub-total key 4K68 and the total key (either 4K63, 4K64, 4K65, or 4K66) which controls the taking of a total for the given accumulator and then touch the starting bar. The mechanisms by which this may be accomplished will shortly be described.

On the other hand, if a total, with clearing, is desired, it is only necessary to depress the total key for the given accumulator and to put the machine through its cycle of operations by touching the starting bar, in order to obtain the total from that accumulator.

The total key release bar 4L66 has a pin 4.9. The sub-total key release bar 4L65 has a pin 4.9. When the sub-total key 4K68 is in its normal elevated position, the two pins 4.9 are separated a sufficient distance to prevent them from engaging the neck of an insert pawl 4.65, said pawl being pivoted to the sub-total key at 4.23 and adapted to move bodily upwardly and downwardly with said key 4K68. When the key 4K68 is in its normal elevated position, the total key release bar 4L66 may be shifted. When said sub-total key 4K68 is depressed, this action brings the head on the upper end of the insert pawl 4.65 between the pins 4.9 and prevents any relative longitudinal movement of the total and sub-total release bars 4L66 and 4L65. The depression of the sub-total key 4K68 permits the sub-total key latch 4.57L to be pulled by its spring into the notch in the key stem of said sub-total key. When this occurs, by reason of the engagement of the latch 4.57L with the lug on the sub-total release bar 4L65, the result is that there is movement of the total key release bar 4L66 and hence the sub-total release arm L68 is moved rearwardly into the path of pin D114 carried by the operating arm or piece 4D50.

At the end of the forward stroke of the arm 4D50, the pin D114 returns the sub-total release arm L68 and the sub-total release bar 4L65 to their normal positions. This action results in releasing the sub-total key 4K68 and at the same time, through the medium of the insert pawl 4.65 and the pins 4.9, the total release bar 4L66 is returned to normal position and the non-add key K69, the subtraction key 4K67, or any of the total keys 4K63, 4K64, 4K65, 4K66 which may have been depressed, will be released so that they will spring up.

Thus, the releasing of a total key at the end of the forward stroke of the machine, causes the machine to take a sub-total and to print the sub-total amount, without clearing the accumulator, as the accumulator retains the amount by reason of the engagement of the racks with the gears of the accumulator.

If the subtraction key 4K67 be depressed, the result will be that subtraction will be carried on in accumulator No. 1, regardless of whether addition is being performed in any or all of the remaining accumulators Nos. 2, 3, and 4. Hence, subtraction may be carried on in accumulator No. 1 even though the carriage is in a position where one or more of the remaining accumulators are arranged for addition.

The accumulator No. 1 is set for subtraction on the depression of the subtraction key 4K67 by mechanism substantially as shown in the patent to Bernau No. 1,508,267, such mechanism including a spring pulled latch pivoted at L20 and connected at NL23 to a subtraction set link N64L co-operating with the accumulator No. 1 as determined by a stud N117.

On depressing the total key 4K66 for the No. 2 accumulator, this key is latched down by its spring pulled latch L59. The latch L59 causes the inner total cam 59L and the inner arm 161L to be shifted to a position whereby, on the operation of the machine, a total may be taken in accumulator No. 2.

The depression of total key 4K65 for the No. 4 accumulator results in latch 4L57 pivoted at L20 holding down said key. The latch 4L57 and lever 4L59 are connected by a link 4.63. The lever 4L59 is shifted when the latch 4L57 moves on the depression of the key 4K65 for accumulator No. 4. Consequently, the pin 4L21 or lever 4L59 then engages and shifts the outer total cam 59L and causes the outer arm 161L to be positioned so that a total may be taken of the amount in accumulator No. 4.

The depression of total key 4K64 for accumulator No. 3 results in the latching down thereof by its spring pulled latch 456L, said latch being pivoted at L20 and carrying on its lower end a pin adapted to co-operate with the outer total cam 4.58L and the arm N60L, bringing them in position so that a total may be taken of the amount in accumulator No. 3.

The depression of total key 4K63 results in the latching down thereof by spring pulled pivoted latch 4L56 which carries on its lower end a pin N22L which is adapted to co-operate with the inner cam 4.58 and the inner arm N60, enabling a total to be taken of the amount on accumulator No. 1.

Reference is to be had to patents heretofore referred to for the trains of mechanisms used in the performance of addition, subtraction, and the taking of totals.

As proposed in Ellis patents heretofore referred to, the stems of the total keys 4K63, 4K64, 4K65, 4K66 are interlocked by the co-operation of pins K12 and pendant pawls L50 with the result that when one of these keys is depressed, the others are locked out so that they cannot be depressed.

The action of the repeat key 4K62 and the error key K61, will be clear from patents heretofore referred to but the improvements now to be described, are provided.

The repeat key bar L61 has a long pin 4.25L which is adapted to be engaged by both of the total cams 4.58L, enabling either one of them to depress said repeat key bar.

The stem of the total key 4K65 for the No. 4 accumulator is provided with a pin 4.21 which is adapted to depress the repeat key bar L61 when the said key 4K65 is depressed.

There is provided an auxiliary repeat key bar 4L61 which is mounted on the same stud 4.23L that carries the usual repeat key bar L61, said stud being carried by the epeat key latch L155 so that when the repeat key 4K62 is depressed and the latch L155 therefor moves to latch down said key, both of the repeat key bars L61 and 4L61 are moved rearwardly.

The auxiliary repeat key bar 4L61 is provided with a downwardly and rearwardly extending angular part 40L61 which may engage a pin 4.8 carried by the total cam 4.58L for accumulator No. 1.

The rear end of the auxiliary repeat key bar 4L61 carries a pin 4.24L which extends under the total cam 59L for accumulator No. 2.

A lever 4.64 is mounted on a pin 4.20L in the side frame. The lever 4.64 is provided with a vertical slot where it is pivoted at 4.20L to enable this lever to have a floating pivotal mounting so that it may be bodily shifted on its pivot, as well as turn on said pivot to enable it to perform new functions. The lever 4.64 has a slot in its forward end which receives the pin 4.24L carried by the auxiliary repeat key bar 4L61. The rear end of the lever 4.64 is pivoted at 4D29 to the hanging bar D65 which controls accumulator No. 2. The pin 4.20L which constitutes the pivot for the lever 4.64 also serves as a stop or abutment for the upper slide bar latch L63.

A lip $a$ on the auxiliary repeat key bar 4L61 extends over the top of L61 and rests thereon.

The constructions described enable the following movements and functions to be obtained. When the repeat key 4K62 is depressed, its latch L155 shifts the main and auxiliary repeat key bars L61 and 4L61 rearwardly and the upper slide bar latch L63 is thereby held out of engagement with the upper roll 40D on the roll plate D155 thus preventing keys set on the numeral keyboard from rising, inasmuch as a repeat key operation is intended to be performed. Reference is to be had to Ellis Patent 1,203,863 in that connection.

If any one of the total keys is depressed, the repeat key bar will be depressed to bring its end in line with the roll 40D and the repeat key thereby released, if it had previously been depressed, such releasing operation occurring when the machine is put through its cycle of operations.

The floating pivotal mounting for the lever 4.64 enables said lever to function in a different way when total key 4K63 for No. 1 accumulator is depressed, than it functions when either of the total keys 4K66, 4K64 or 4K65, respectively controlling accumulators Nos. 2, 3, and 4, is depressed.

If total key 4K63 for accumulator No. 1 is depressed at the same time that the repeat key 4K62 is depressed, the lever 4.64 will turn or pivot on its pin 4.20L and its rear end will become elevated, thereby releasing the latch D61 from its engagement with the controlling arm D158 for the No. 2 accumulator. When the machine is put through its cycle of operations under this condition, the total taken in accumulator No. 1 will be added into accumulator No. 2, without regard to the position of the carriage; that is, to say, under such a condition, the carriage need not be in position to render active for addition accumulator No. 2.

The total key 4K63 for the No. 1 accumulator is the only total key which can be depressed simultaneously with the repeat key 4K62 and effect any transfer of a total in the machine. This train of mechanism is illustrated in Fig. 19.

Description has been given of the manner in which the No. 2 accumulator is engaged with the racks when the hanging bar lever 4F62 is rocked clockwise to raise the bar D65 and release the control pin arm D158 by moving the latch D61. This same latch D61 is adapted to be raised to release its associated control pin arm D158 upon simultaneous depression of the repeat key 4K62 and the No. 1 total key 4K63 in the following manner.

When the key 4K62 is depressed, the latch L155 is rocked clockwise as the notch in the key arrives opposite the flange of said latch, which causes the repeat slide 4L61 to move to the left. Slide 4L61 carries a pin 4—24L projecting in a slot in a lever 4—64 connected at 4D29 to the lower end of the hanging bar D65, which hanging bar is connected at 10D to the control pin arm latch D61 associated with the accumulator No. 2. The No. 1 total key 4K63, being depressed simultaneously with the repeat key, allows its latch 4L56 to be rocked clockwise when the notch in the key arrives opposite the flange on that latch. This moves the pin N22L to the left and contacts and moves the total cam 4—58L clockwise about its pivot 4—3. This total cam 4—58L carries a pin 4—8 extending over a foot 40L61 of the slide 4L61. When the cam 4—58L is lowered the pin 4—8 rocks the slide 4L61 counter-clockwise around its pivot 4—23L, whereupon the pin 4—24L rocks the lever 4—64 about its pivot 4—20L, thus rocking the latch D61 counter-clockwise in the same manner that it was rocked when the hanging bar lever 4F62 was rocked by the carriage during straight addition.

It will be seen, therefore, that with the No. 1 total key and the repeat key simultaneously depressed, the No. 2 accumulator will be engaged with the racks at exactly the same time that it is engaged therewith during the regular adding operation.

The depression of the No. 1 total key 4K63 and consequent rocking of the total cam 4—58L raises the arm N60L so that its end lies just to the right of the lower end of the flying lever D53 associated with No. 1 accumulator. With the parts in such positions, upon clockwise movement of the operating arm 4D50 the flying lever D53 is not rocked on its pivot D15, as is the case in adding operations, because the arm N60L obstructs any counter-clockwise movement of the flying lever at this time. Consequently, as the pivot D15 is carried with the arm 4D50 the accumulator engaging rod D56 is immediately moved to the right and the upper accumulator No. 1 is therefore immediately engaged with the adding racks before they are moved, so that when they are moved the amount placed thereon will be the amount taken from the No. 1 accumulator.

After the racks R50 have been so set according to the amount which was on the No. 1 accumulator, then the flying lever D54 of the No. 2 accumulator draws the engaging rod D157 to the right, the same as it does during adding operations, and at exactly the same time due to the fact that the latch was operated, upon the simultaneous depression of the No. 1 total key and repeat key. As the racks R50 are restored, the amount, of course, is accumulated into the No. 2 accumulator, which amount is the total that was previously standing on the No. 1 accumulator.

Thus, the simultaneous depression of the No. 1 total key 4K63 and the repeat key 4K62 causes a transfer of the total from No. 1 accumulator to No. 2 accumulator.

With this exception, the control of the accumulators for addition is solely by the tabulated position of the carriage.

On the other hand, the floating mounting at 4.20L for the lever 4.64 enables the lever to shift so that there will be no transfer of addition into other accumulators when any one of the total keys 4K66, 4K64, or 4K65 for accumulators Nos. 2, 3, or 4 is depressed.

The total key release bar 4L66 has lugs along its upper edge to engage, and restore, the latches for the non-add key K69 the subtraction key 4K67 and the total keys 4K63, 4K64, 4K65, 4K66, such operation being well understood from the disclosures of the Ellis patents heretofore mentioned.

The sub-total key release bar 4L65 which lies alongside the bar 4L66, has a projection on its lower edge to restore the latch 4.57L for the sub-total key 4K68.

The controlling key stems are provided with springs to raise them to normal position and said stems are guided in the horizontal bar 4K90 in the lower front part of the machine, in accordance with the Ellis patents heretofore mentioned.

The subtraction key 4K67 and the No. 2 totalizer key 4K66 may be simultaneously depressed for the purpose of determining the amount of overdraft, which operation can be understood from Figs. 3 and 19.

For example, let it be assumed that accumulator No. 1 has 24¢ on it, and that an operation is made subtracting 26¢ from this accumulator, this should leave an overdraft of 2¢ in the No. 1 accumulator. To obtain a positive reading of this overdraft the No. 1 key 4K63 and the repeat key 4K62 are depressed, which has the effect of clearing the No. 1 accumulator and transferring that amount, which in this case is an overdraft in the negative form, that is, the complement of the true overdraft. After such complement has been placed in No. 2 accumulator, then the No. 2 key 4K66 and the subtracting key 4K67 are simultaneously depressed, which clears the negative overdraft out of No. 2 accumulator, subtracting it from the No. 1 accumulator which was previously cleared, thus leaving in the No. 1 accumulator the true or positive overdraft.

The No. 2 accumulator now contains the negative overdraft, which in the example given, is 9,999,999.98. The depression of the subtracting key 4K67 allows the lever NL160 (Fig. 3) to rock clockwise about its pivot L20, thus moving the link N64L to the left. This link is normally held in the position shown in Fig. 3 by the stud N117, and when moved to the left the stud enters a notch in the link which allows the same to be lowered, thus moving the pin NL26 in the left end of the link downwardly, whereupon the subtracting operating latch 168N is permitted to rock clockwise to engage the pin on the end of the No. 1 accumulator engaging rod D56. Consequently, when this rod is moved to the right, as in the manner above explained, the subtracting latch is drawn toward the right to put the No. 1 accumulator in position to have subtracted therefrom whatever amount is put into the racks during this particular operation, which in this instance is the amount cleared from the No. 2 accumulator, namely, 9,999,999.98, the complement of the overdraft.

The engagement of the No. 2 accumulator at this time takes place in the usual manner under control of the inner total cam 59L and the inner arm 161L shifted into such a position that the flying lever causes engagement of the No. 2 accumulator before the racks are moved, thus clearing the amount therefrom.

Now, due to the fact that accumulator No. 2 is cleared and that amount put into the racks, and then the No. 1 accumulator subtractively engaged with these racks, the amount 9,999,999.98 will be subtracted from the zeros of the No. 1 accumulator, thus leaving in that accumulator the true amount of 0,000,000.02. The No. 1 accumulator may now be cleared by the depression of the No. 1 total key 4K63, and upon such operation the amount .02 will be printed as the positive overdraft which was taken from No. 1 accumulator.

The subtraction key may also be depressed when clearing the No. 3 or No. 4 accumulator, and in that event whatever amount was on the No. 3 or No. 4 accumulator would be automatically subtracted from the amount standing on the accumulator No. 1.

The signal or symbol setting mechanism, is operated by a horizontally slidable cam bar 4.52, which locks out the remaining keys (except as hereinafter noted) on the same general principle as set up in the patent to Bernau No. 1,599,634, September 14, 1926 but the signal printing mechanism and the manner in which it is operated from the cam bar 4.52, differs from the construction in the said Bernau patent.

Referring to Fig. 8, the cam bar 4.52 is slidably mounted on studs 11L. A link 4.59 connected to the bar 4.52 at 4.10 is pivoted to a crank 4.58 secured to rock shaft 4.1 which extends crosswise of the machine.

A crank 4.53 secured to the shaft 4.1 has pivoted thereto a link 4.54 which is jointed at 4.11 to another link 4.56 which is pivoted at P18P to the symbol or signal printing sector L65P. The signal sector has symbols designated "1", "3", "4", "2", "S", corresponding to the accumulators Nos. 1, 3, 4, and 2 and to the operation of subtraction so that, according to the depression of the total keys and the subtraction key, the signal printing sector L65P will be positively and directly set by the camming action exerted by the depressed key on the cam bar 4.52.

The weight of the signal mechanism parts, which may be assisted by a spring, restores the cam bar 4.52 to its normal position which is shown in Fig. 8.

One of the arms of the printing group is shown at P52, the symbol or signal sector L65P being pivoted thereto. Normally, the signal printing sector is positioned so that it will not print when the right hand printing arm P52 moves toward the platen to print a numeral in the units column.

For a description of the construction and operation of the printing group, reference is to be had to the Ellis patents heretofore referred to.

When the total key 4K63 of the No. 1 accumulator is depressed, the lower end of the key stem thereof, by a camming action, shifts the cam slide 4.52, which results in turning of the shaft 4.1 by a direct action and the positive and direct turning of the signal sector L65P to locate the "1" symbol in printing position. Similarly, depression of any of the other total keys or the subtraction key seen at the left of Fig. 8, shifts slide 4.52 to such a distance that the corresponding symbol "2", "S", etc. will be brought to the printing line.

As distinguished from the signal printer of the Bernau Patent 1,599,634, the present signal printer effects a positive raising or lowering of the signal sector L65P, without auxiliary mechanism.

To prevent overthrow or false positioning of the sector L65P, the notches at the bottoms of the cams of the slide 4.52 are provided so that the symbol printing sector will remain where set by the depressed key. The keys which have not been depressed, are locked out by this action, with the following exception. The seat in the cam slide 4.52 for the total key 4K66 for the No. 2 accumulator is made sufficiently wide so that the stem of the subtraction key 4K67 may be depressed even though the key 4K66 has been depressed, or, both of these keys may be simultaneously depressed. This permits the total in accumulator No. 2 to be subtracted from the amount in accumulator No. 1, that is, from the combined adding and subtracting accumulator, it being remembered that accumulators Nos. 2, 3, and 4 are adding accumulators.

To insure correct alinement of the symbol type "1", "3", "4", "2", "S" with the printing line of the types set up in the printing group carried by the arms P52, there are provided the following devices. A symbol alining latch 4.57 which is pivoted to the stationary plate P50 of the printing group at 23.10, has teeth or notches adapted to engage pin 4.13 carried by an arm 4.55 which is pivoted at P10P to plate P50. The arm 4.55 carries the pivot 4.11 for the links 4.54 and 4.56. Consequently, the stud or lug 4.13 is raised a proper distance to engage the proper notches in the latch 4.57 to insure the desired result. A spring 4.14P which connects the latch 4.57 with a stud projecting from the plate P50 tends to swing the latch on its pivot 23.10 to cause the latch to position the notches to receive the lug 4.13. However, the printing arm P74 carried by the printing shaft P1 has a pin 124P which normally engages the latch 4.57 and prevents this result. When the machine is put through its cycle of operations, the printing arm P74 moves downwardly and permits the spring 4.14R to swing the latch 4.57 and cause the proper notch to engage the pin 4.13. Thus, despite any lost-motion or inaccuracies caused by the linkages leading from the cam slide 4.52 to the sector L65P will be compensated for and correct alinement of the symbols will be effected.

An arm 63P which is pivoted to the plate P50, has a pin P116P which rests on the upper edge of the latch 4.57 and this arm also carries a pin P15P which is adapted to move the first order hook and permit the printing of a clear signal.

What I claim is:

1. In a calculating machine, the combination with a travelling carriage, of a plurality of accumulators, and operating mechanism therefor, of means operated by the carriage constituting the sole means of the machine whereby the respective accumulators may be selectively conditioned for accumulation, a sub-total key, total keys for the respective accumulators, whereby said operating mechanism may be conditioned for the taking of a total from the selected accumulator, and mechanism co-operating with said sub-total key and with the respective total keys, requiring the conjoint use of said sub-total key and any selected one of said total keys to condition the corresponding accumulator for the taking of a sub-total therefrom.

2. In a calculating machine, the combination with a plurality of accumulators, and operating mechanism therefor, of total keys for the respective accumulators whereby the operating mechanism for said accumulators may be conditioned for the taking of a total from the selected accumulator, a sub-total key, and mechanism co-operating with said sub-total key and with the respective total keys, requiring the conjoint use of said sub-total key and any selected one of said total keys to condition the mechanism for the taking of a sub-total from the corresponding accumulator.

3. In a calculating machine, the combination with a travelling carriage, a plurality of accumulators, and operating mechanism therefor, of accumulator-controlling-means adapted solely for operation by the carriage when in its tabulated positions, constituting the only means embodied in the machine whereby the respective accumulators may be conditioned for performing an additive accumulation, total keys for the respective accumulators whereby the operating mechanism may be conditioned for the taking of totals from the respective accumulators, and a subtraction key and means operated thereby for rendering one of said accumulators effective to perform a subtracting operation regardless of the position of the carriage and its control of the accumulators.

4. In a calculating machine, the combination with a travelling carriage, a plurality of accumulators, and operating mechanism therefor, of accumulator-controlling-means adapted solely for operation by the carriage when in its tabulated positions, constituting the only means embodied in the machine whereby the respective accumulators may be selectively conditioned for additive accumulation, a sub-total key, total keys for the respective accumulators, whereby said operating mechanism may be conditioned for the taking of a total from the selected accumulator, mechanism co-operating with said sub-total key and with the respective total keys, requiring the conjoint use of said sub-total key and any selected one of said total keys to condition the corresponding accumulator for the taking of a sub-total therefrom, and a subtraction key and means operated thereby for rendering one of said accumulators effective to perform a subtracting operation regardless of the position of the carriage and its control of the accumulators.

5. In a calculating machine, the combination with a plurality of independent accumulators, and accumulator controlling and operating mechanism for the respective accumulators of independent total keys for the respective accumulators whereby the operating mechanism for said accumulators may be selectively conditioned for the taking of a total from the particular accumulator desired to be used, a repeat key, and mechanism co-operating with said repeat key and total keys and with the accumulator controlling and operating mechanism to effect the transfer from the selected accumulator into another one of said accumulators of the total carried by the latter, when such total is taken.

6. In a calculating machine, the combination with a travelling carriage, of a plurality of independent accumulators, and accumulator controlling and operating mechanism for the respective accumulators, of means operated by the carriage constituting the sole means of the machine whereby the respective accumulators may be conditioned for accumulation, independent total keys for the respective accumulators whereby the accumulator controlling and operating mechanism may be conditioned for the independent taking of totals from the respective accumulators, a repeat key, and mechanism co-operating with said repeat key and total keys and with the accumulator controlling and operating mechanism to effect the transfer from the selected accumulator into another one of said accumulators of the total carried by the latter when a total is taken, regardless of the position of the carriage and its control of the accumulators.

7. In a calculating machine, the combination with a movably mounted symbol printer, of a plurality of operating keys adapted for controlling different functions of the machine, and a positive push-and-pull mechanism, operated to different extents by the respective keys aforesaid, for setting the symbol printer in different positions, comprising a cam-bar operated by the keys, a rock-shaft, a link and crank connecting the cam-bar to the rock shaft, and a crank and linkage connecting the rock shaft to the symbol printer.

8. In a calculating machine, the combination with a movably mounted symbol printer, of a plurality of operating keys adapted for controlling different functions of the machine, a positive push-and-pull mechanism, operated to different extents by the respective keys aforesaid, for setting the symbol printer in different positions, a movably mounted alining latch having alining devices, and means operated by said push-and-pull mechanism adapted to engage the alining devices according to the setting of the symbol printer.

9. In a calculating machine, the combination with a settable symbol printer, and operating means therefor including a key-interlock, of a plurality of total keys adapted to shift said interlock, thereby to set the symbol printer, said key-interlock preventing operation of another total key when one of them has been moved, a subtraction key adapted to co-operate with said key-interlock, means being provided whereby said subtraction key and a given one of said total keys may both be operated, and accumulators from which totals may be taken under the control of the total keys, one of said accumulators being adapted either for addition or subtraction, and means whereby the total carried by said combined adding and subtracting accumulator may be subtracted from that one of the aforesaid accumulators which is under the control of the total key specified.

10. In a calculating machine, the combination with a travelling carriage and actuators, of main accumulators which are operable by said actuators and of which at least one is a subtracting accumulator, and an auxiliary accumulator also operable by said actuators, accumulator-controlling-means adapted solely for operation by the carriage when in its tabulated positions, constituting the only means embodied in the machine whereby any one, or more, of the aforesaid accumulators may be selectively engaged with said actuators for additive accumulation, and independent total keys controlling the taking of totals from the respective accumulators.

11. In a calculating machine, the combination with a travelling carriage and actuators, of main accumulators which are operable by said actuators, and auxiliary accumulators also operable by said actuators, at least one of the aforesaid main accumulators being a combined adding and subtracting accumulator, and the remaining main and auxiliary accumulators being straight adding accumulators, means whereby one of said adding accumulators and said combined adding and subtracting accumulator may be made jointly engageable by said actuators embodying accumulator-controlling-means adapted solely for operation by the carriage when in its tabulated positions, constituting the only means embodied in the machine for rendering the remaining accumulators selectively engageable with said actuators for additive accumulation, and independent total keys controlling the taking of totals from the respective accumulators.

12. In a calculating machine, the combination with actuators, of main accumulators which are operable by said actuators, and auxiliary accumulators also operable by said actuators, a travelling carriage, means solely operated by said carriage controlling the co-operation of said accumulators with the actuators for addition, whereby any one, or more, of the accumulators may be made selectively engaged with said actuators for addition, a combined adding and subtracting accumulator also subject to control by the carriage for co-operation with the actuators for addition, independent total keys controlling the taking of totals from the respective accumulators, and a subtracting key and means operated thereby for controlling the co-operation of the combined adding and subtracting accumulator with the actuators for subtraction, irrespective of the control of said accumulators exercised by said carriage for additive purposes.

13. In a calculating machine, the combination with a plurality of accumulators, and operating mechanism therefor, of total keys for the respective accumulators whereby the operating mechanism for said accumulators may be conditioned for the taking of a total from the selected accumulator, and a sub-total key adapted for co-operation with said operating mechanism whose conjoint action with any of said total keys is necessary in order to take a sub-total from the selected accumulator.

14. In a calculating machine, the combination with a plurality of accumulators, and operating mechanism therefor, of independent total keys for the respective accumulators for independently conditioning said operating mechanism so that a total may be taken from any selected one of the respective accumulators, and a sub-total key adapted for co-operation with said operating mechanism whose conjoint action with any one of said total keys is necessary in order to take a sub-total from the selected accumulator, and mechanism controlled by the carriage whereby the aforesaid accumulator operating mechanism may be conditioned to transfer such sub-total to any or all of the other accumulators.

15. In a calculating machine, the combination with a plurality of adding accumulators and a subtracting accumulator, and operating mechanism for the respective accumulators, of independent total keys for the respective accumulators, whereby the operating mechanism for said accumulators may be conditioned for the taking of a total from the selected adding accumulator independently of the remaining accumulators, a subtracting key, whereby the operating mechanism of the subtracting accumulator may be conditioned to subtract such total on the selected adding accumulator from the subtracting accumulator by the conjoint setting of the subtracting key and the total key for the selected accumulator, and means controlled by the carriage whereby such total may be added into one or all of the remaining adding accumulators.

16. In a calculating machine, the combination with a plurality of accumulators, one of which is a subtracting accumulator and operating mechanism therefor, of total keys for the respective accumulators, a sub-total key, whereby when a total key and the sub-total key are used conjointly, the operating mechanism may be conditioned for the taking of a sub-total from the selected adding accumulator, a subtracting key, whereby the operating mechanism may be conditioned to subtract such sub-total from the subtracting accumulator, and means controlled by the carriage whereby the operating mechanism may be conditioned to add such sub-total into one or all of the remaining accumulators.

17. In a calculating machine, the combination with a plurality of accumulators, one of which is a subtracting accumulator, and operating mechanism therefor, of total keys for the respective accumulators whereby the operating mechanism for said accumulators may be conditioned for the taking of a total from the selected adding accumulator, a subtracting key, whereby the operating mechanism of the subtracting accumulator may be conditioned to subtract such total from the subtracting accumulator, means controlled by the carriage whereby such total may be added into any or all of the remaining accumulators, and a non-add key whereby the action of the means controlled by the carriage will be nullified and the total will not be added into the remaining accumulators.

18. In a calculating machine. the combination of a plurality of accumulators, and operating mechanism therefor, of total keys for the respective accumulators, a sub-total key, whereby when a total key and the sub-total key are used conjointly, the operating mechanism may be conditioned for the taking of a sub-total from the selected adding accumulator, a subtracting key, whereby the operating mechanism of the subtracting accumulator may be conditioned to subtract such sub-total from the subtracting accumulator, means controlled by the carriage whereby such sub-total may be added into any or all of the remaining accumulators, and a non-add key whereby the action of the means controlled by the carriage will be nullified and the sub-total will not be added into the remaining accumulators.

19. A calculating machine having a travelling platen-carrying carriage, a plurality of accumulators, and operating mechanism for said accumulators, said operating mechanism having projecting points, corresponding points adjustable on the carriage, and movable therewith which are adapted to shift the aforesaid points on the operating mechanism when contacting therewith, which movement of the points conditions the operating mechanism to cause addition in the accumulator or accumulators corresponding to the point or points moved, the disposition of the accumulator-operating points being in the line of travel of the carriage, means for locking and releasing the starting bar of the machine, and means common to the aforesaid operating mechanism having points, whereby said locking and releasing means is operated.

20. A calculating machine having a travelling platen-carrying carriage, a plurality of accumulators, and operating mechanism for said accumulators, said operating mechanism having projecting points, corresponding points adjustable on the carriage, and movable therewith which are adapted to shift the aforesaid points on the operating mechanism when contacting therewith, which movement of the points conditions the operating mechanism to cause addition in the accumulator or accumulators corresponding to the point or points moved, the disposition of some of the accumulator-operating points being in the line of travel of the carriage and of others across such line of travel, means for locking and releasing the starting bar of the machine, and means common to the aforesaid operating mechanism having points, whereby said locking and releasing means is operated.

In testimony whereof I affix my signature.

EMIL JOHN ENS.